United States Patent [19]

Waddoups

[11] 3,950,747
[45] Apr. 13, 1976

[54] OPTICAL PROCESSING SYSTEM FOR SYNTHETIC APERTURE RADAR

[75] Inventor: Ray O. Waddoups, Valencia, Calif.

[73] Assignee: International Telephone & Telegraph Corporation, New York, N.Y.

[22] Filed: Feb. 28, 1975

[21] Appl. No.: 553,969

[52] U.S. Cl. ............................................. 343/5 CM
[51] Int. Cl.² ........................................... G01S 9/02
[58] Field of Search ................................. 343/5 CM

[56] References Cited
UNITED STATES PATENTS

| | | | |
|---|---|---|---|
| 3,560,973 | 2/1971 | Kazel | 343/5 CM |
| 3,727,219 | 4/1973 | Graham | 343/5 CM |
| 3,808,596 | 4/1974 | Kazel | 343/5 CM X |

Primary Examiner—Malcolm F. Hubler
Attorney, Agent, or Firm—William T. O'Neil

[57] ABSTRACT

An optical processing system for a synthetic aperture radar moving target indicator or otherwise in which a graduated light filter provides minimum to a maximum transmission over a laser beam width. The laser beam then shines through the filter, an exposed film containing a phase history and through one or more field stop slits or a spatial filter to an unexposed film. The filter compensates for the lack of an infinitely long laser beam required for a Fourier transform of the phase history into what is not but is mostly indistinguishable from a photographic image of stationary and/or moving targets. The filter suppresses false images sometimes called side-lobes.

2 Claims, 7 Drawing Figures

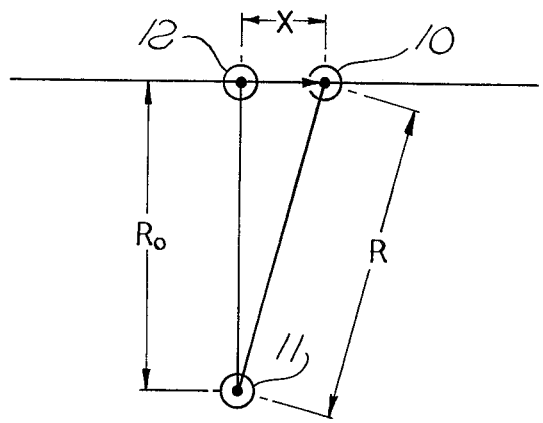
FIG.1.
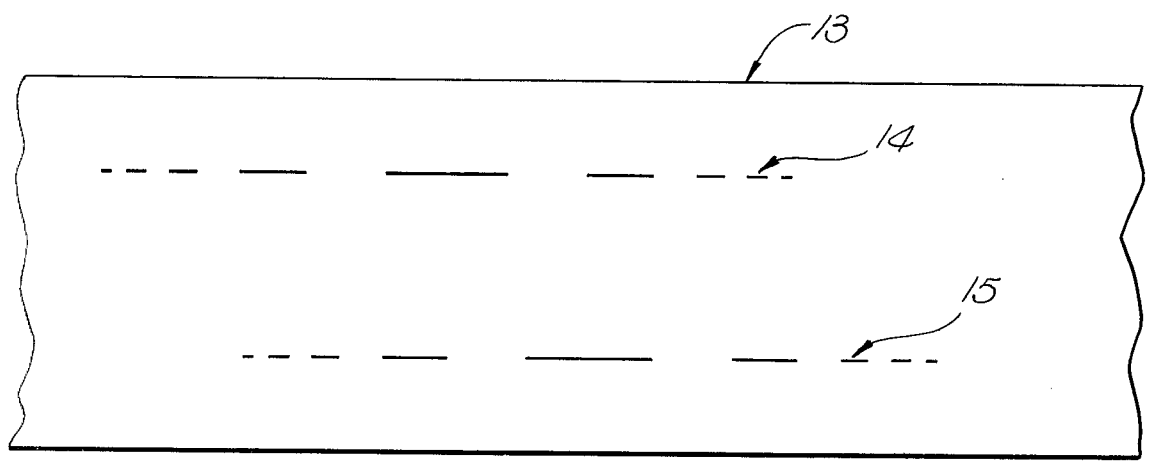
FIG.2.
FIG.6.
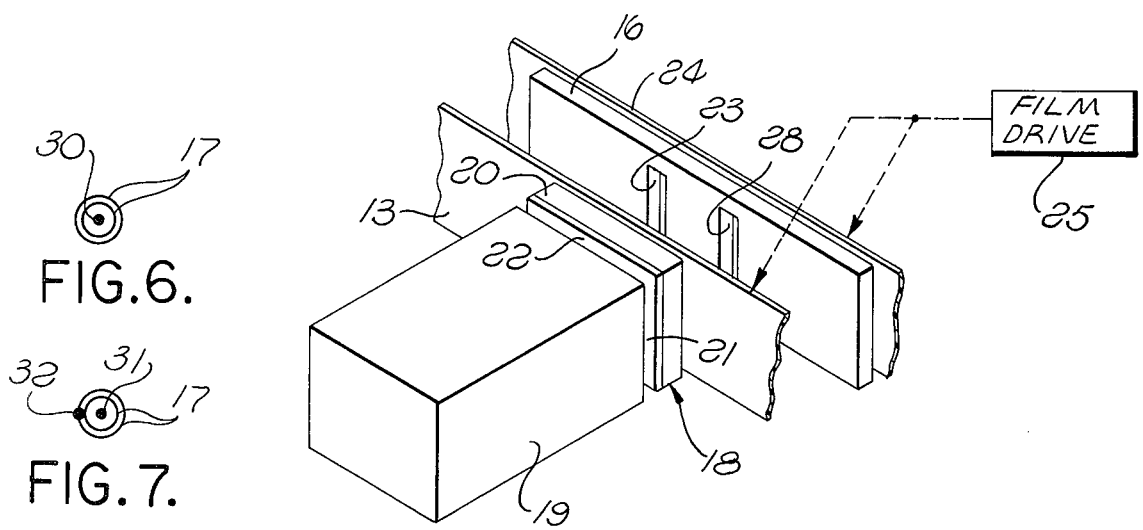
FIG.7.
FIG.3.

3,950,747

OPTICAL PROCESSING SYSTEM FOR SYNTHETIC APERTURE RADAR

BACKGROUND OF THE INVENTION

This invention relates to the art of radar mapping, and more particularly to a false image or sidelobe suppression optical processing system for a synthetic aperture radar moving target indicator (MTI) or otherwise.

Radar mapping with synthetic aperture radar MTI is old and well known in the art. For example, see the following three references:

1. *Synthetic Aperture Radar Systems* by Robert O. Harger (Academic Press, New York, 1970);
2. Radar Handbook, Chapter 23, Merrill Skolnik (McGraw-Hill, New York, 1970);
3. Microwaves, pages 46 through 54 (November, 1968).

In the past, an attempt has been made to perform the Fourier transform of the phase history of a synthetic aperture radar by shining, for example, a laser beam, six inches square in cross section, therethrough while the phase history is moved. A Fourier transform which will reproduce a true image requires the use of an infinitely wide laser beam. The truncation of the phase history by the finite beam then causes false images or sidelobes.

SUMMARY OF THE INVENTION

In accordance with the system of the present invention, the above-described and other disadvantages of the prior art are overcome by providing a graduated light filter for a synthetic aperture radar optical processing system.

The illumination of the phase history performs an imperfect Fourier transform thereof to an image on film which is so like a photographic image that the two are substantially indistinguishable. The imperfections show up as false images on the film. The false images or sidelobes, however, are reduced by the filter.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 1 is a plan diagram of radar mapping geometry;
FIG. 2 is a side elevational view of an exposed film carrying the phase histroy of a synthetic aperture radar;
FIG. 3 is a perspective view of the optical processing system of the present invention;
FIGS. 6 and 7 are views of target and sidelobes where
FIGS. 6 and 7 illustrate stationary and moving targets, respectively.

DESCRIPTION OF THE PREFERRED EMBODIMENTS

Figure 4:
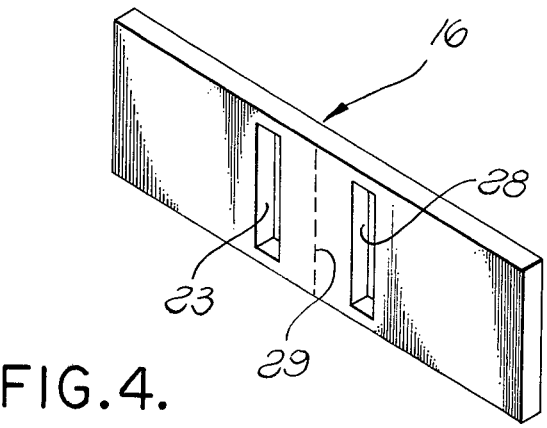
FIG. 4 is a perspective view of a field stop or spatial filter shown in FIG. 3.

In FIG. 1, by inspection, the phase difference $\phi$ between the conventional coherent (coho) oscillator output at aircraft position 10 and the wave of nearly the same frequency reflected from target 11, is, in radians, $$\phi = \frac{2\pi(R - R_o)}{\lambda} \quad (1)$$

where $\lambda$ is the coho free space wavelength, and $\pi$ is 3.1416. The transmitted wave may have been transmitted from point 12.

The phase detected doppler is recorded on film 13 in dashed lines 14 and 15 in FIG. 2 by, for example, a cathode-ray tube. If desired, target 14 may be located at a greater range than target 15. Film 13 may be filled with targets, not shown, such as targets 14 and 15.

Again by inspection of FIG. 1, $$R = \sqrt{R_o^2 + x^2} \quad (2)$$

$$R = R_o \sqrt{1 + \left(\frac{x}{R_o}\right)^2} \quad (3)$$

Equation (3) may be expanded into a Maclaurin's power series thus $$\frac{R}{R_o} = 1 + \left(\frac{1}{2}\right)\left(\frac{x}{R_o}\right)^2 - \left(\frac{1}{8}\right)\left(\frac{x}{R_o}\right)^4 \quad \vdots \quad (4)$$

Power series (4) converges for $$\left(\frac{x}{R_o}\right)^2 < 1 \quad (5)$$

As a practical matter $$\left(\frac{x}{R_o}\right)^2 << 1 \quad (6)$$

Series (4) thus converges very rapidly and $$\frac{R}{R_o} \cong 1 + \left(\frac{1}{2}\right)\left(\frac{x}{R_o}\right)^2 \quad (7)$$

Thus, $$\phi = \left(\frac{2\pi R_o}{\lambda}\right)\left(\frac{1}{2}\right)\left(\frac{x}{R_o}\right)^2 \quad (8)$$

and $$\phi = \left(\frac{\pi}{\lambda R_o}\right)(x^2) \quad (9)$$

If the airplane is flying from 12 to 10 at a constant velocity, $v$, $$\phi = \left(\frac{\pi v^2}{\lambda R_n}\right) \left(t^2\right) \qquad (10)$$

where $t$ is time.

The system of the present invention is illustrated in a perspective view in FIG. 3 including a laser 19 for projecting a monochromatic beam of light, for example, 6 inches square, through a graduated light filter 18 having a glass portion 20, and a photographic film 21 bonded thereto. Film 21 has a light transmission which is a maximum along a vertical line at a location 22.

A field stop or spatial filter 16 is provided having one or more vertical slits therethrough, one of which is illustrated at 23 in FIG. 4.

Film 13 is positioned between filter 18 and filter 16, and an unexposed film 24 is located on a side of filter 16 opposite the side on which film 13 is located.

Films 13 and 24 are moved synchronously by film drive 25.

Figure 5:
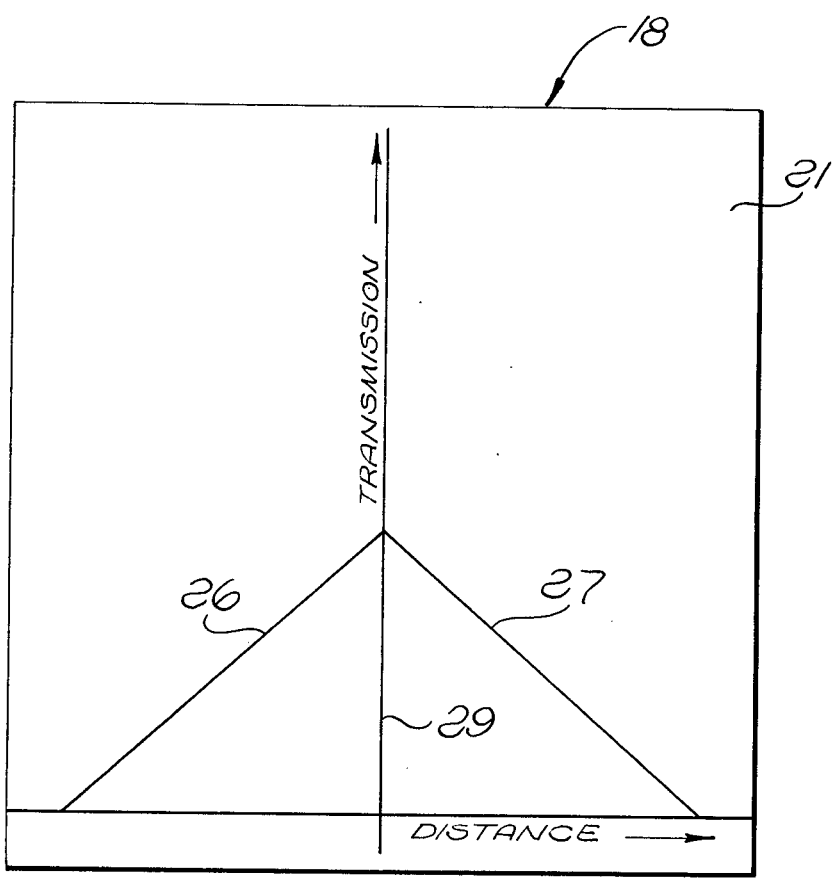
FIG. 5 is a front elevational view of a graduated light filter with the transmission thereof graphed thereon as a function of distance.

If desired, transmission of graduated light filter 18 versus distance may be as indicated at 26 and 27 in FIG. 5.

Filter 18 may be any conventional neutral density filter where the light transmission varies in the manner indicated at 26 and 27 in FIG. 5 or in some other manner to produce the desired reduction in sidelobes.

In an MTI system, spatial filter 16 may have two slits 23 and 28 equally spaced on opposite sides of a center line 29 on the surface of film 21 shown in FIG. 5, and assembled as shown in FIG. 3.

It is an outstanding feature of the present invention that sidelobes 17 of targets 30 and 31 in FIGS. 6 and 7, respectively, may be reduced in magnitude 2,000 percent or more! Thus, in an MTI system, a moving target indication at 32 in FIG. 7 may not be confused by the sidelobes 17 in FIG. 7.

Although the lines 26 and 27 in FIG. 5 are linear, they may be curved by Taylor or other appropriate weighting.

OPERATION

In the operation of the present invention, the doppler signals are recorded on film 13 as illustrated in FIG. 2. The system of FIG. 3 is then employed, which may be entirely conventional except for the graduated light filter 18.

In accordance with the present invention, it is desirable to employ film 13 in the usual manner similar to a diffraction grating, but more nearly like a zone plate. When this is done, film 24 is exposed through slits 23 and 28 shown in FIG. 4 because laser 19 establishes a monochromatic light beam which passes through graduated light filter 18, film 13, slits 23 and 28, and exposes film 24. Films 13 and 24 may simultaneously and synchronously be driven to the left, as viewed in FIG. 3, by film drive 25. The beam projection as aforesaid provides a Fourier transform of the phase history recorded on film 13. However, in order to reproduce a target image precisely, the laser beam would have to be of an infinite width. Because it is only 6 inches long, when certain ones of the dashes 14, 15 or otherwise on film 13 shown in FIG. 2 enter the laser beam, they produce false images or sidelobes as indicated at 17 in FIGS. 6 and 7. In accordance with the present invention, the intensity of sidelobes 17 is reduced by 2,000 percent or more. This is accomplished through the use of the graduated light filter 18 with the transmission characteristic indicated at 26 and 27.

Effect of Finite Phase Histories:

In synthetic aperture radar, a phase history is recorded as the receiving position is moved along a base line. The spatial frequencies recorded, $F(k)$, are just the Fourier transform of the target position. (Scale factors for recording will be ignored in this treatment.) To produce the map, then, the Fourier transform of $F(x)$ is taken to produce the one dimensional spatial pattern where $k$ is the spatial frequency $$f(x) = \int_{-\infty}^{\infty} F(k) e^{-i2\pi kx} dk \qquad (11)$$

in the $x$ direction. Inspection of the above equation reveals a very important detail. The limits of integration are $-\infty$ to $\infty$. Because targets are only illuminated when within a finite beamwidth, phase histories can only be recorded over a finite interval and the integral has finite limits $$f^1(x) = \int_{k_1}^{k_2} F(k) e^{-i2\pi kx} dk \qquad (12)$$

which is the same as:

$$= \int_{-\infty}^{\infty} A(k) F(k) e^{-i2\pi kx} dk \qquad (13)$$

where $A(k)$ is the rectangular function:

$A(k) = 1$ for $k_1 \leq k \leq k_2 = 0$ for $k_1 > k > k_2$

The transform of equation (13) gives $f(x)$ convolved with $a(x)$ $$f^1(x) = a(x) * f(x) \qquad (14)$$

MTI

When phase histories of moving targets are recorded, the temporal frequency is shifted by $$\frac{2v}{\lambda}$$

and the spatial frequency by $$\frac{2v}{\lambda v_a}$$

where $v_a$ is the speed of the receiver position changes.

$$F(k_m) = F\left(k \pm \frac{2v}{\lambda v_a}\right) \qquad (15)$$

Where $F(k_m)$ is the frequency of the moving targets, the target radial velocity is $v$, and the radar wavelength is $\lambda$. According to the transform shift rule, the position where the image is formed is shifted. Spatial filtering in the transform plane is used to block fixed target images and pass moving target images.

Field stop or spatial filter 16 shown in FIGS. 3 and 4 may have more than one slit and, for MTI purposes, may be moved lengthwise one-half of the slit spacing.

When finite phase histories are considered, a problem arises. A convolution results as in equation (14), and the resulting target images have a sidelobe structure. The MTI discrimination is limited by the level of fixed target sidelobes, e.g. 17 in FIGS. 6 and 7, within the bandpass of the spatial filters.

Solution

The illumination of the phase history is weighted to reduce the sidelobes of $a(x)$. This is most easily done by inserting the graduated light filter 18 in the optical path near the phase history. The value of $a(x)$ is then:

$$a(x) = \left(\frac{\sin x}{x}\right)^2 \quad (16)$$

and the first sidelobes are reduced to 26 dB. If more than 26 dB discrimination against fixed targets is desired, other filter patterns with still lower sidelobes can be used.

This weighting technique is applicable to any optically processed synthetic aperture MTI system in which sidelobes produce false targets. This includes MLS technology systems in which optical processing may be used as well as more conventional synthetic aperture.

What is claimed is:

1. A sidelobe suppression optical processing system for synthetic aperture radar, said system comprising: a spatial filter having two slits extending therethrough and extending in a first predetermined lengthwise direction; a synthetic aperture radar exposed first film having a phase history recorded thereon, said first film having first and second sides, said first film second side being positioned approximately parallel to and adjacent to one side of said spatial filter adjacent said slits, said phase history being recorded in dashed lines on said first film approximately perpendicular to the length of said slits; at least a partially unexposed second film positioned on the other side of said spatial filter approximately parallel thereto and adjacent said slits; a source for producing a beam of monochromatic light having a plane wavefront moving in a second predetermined direction; and a graduated light filter in registration with the beam and positioned approximately in a plane parallel to and between said spatial filter and said source, said source being oriented to cause said wavefront to move toward said graduated light filter in positions parallel thereto, said graduated light filter having a peak transmission at a point midway between said slits and a transmission decreasing on both sides of said point in opposite directions away therefrom.

2. The invention as defined in claim 1, wherein motive power means are connected with said first and second films to drive them synchronously across said slit.

* * * * *